(12) United States Patent
Lang

(10) Patent No.: US 6,490,918 B2
(45) Date of Patent: Dec. 10, 2002

(54) PISTON-TYPE QUANTITY METER

(75) Inventor: Gerhard Lang, Birkenheide (DE)

(73) Assignee: Spanner-Pollux GmbH, Ludwigshafen (DE)

( * ) Notice: Subject to any disclaimer, the term of this patent is extended or adjusted under 35 U.S.C. 154(b) by 38 days.

(21) Appl. No.: 09/799,319

(22) Filed: Mar. 5, 2001

(65) Prior Publication Data

US 2002/0124639 A1 Sep. 12, 2002

Related U.S. Application Data

(63) Continuation-in-part of application No. 09/113,709, filed on Jul. 10, 1998, now abandoned.

(30) Foreign Application Priority Data

Jul. 17, 1997 (DE) .......................... 197 30 605

(51) Int. Cl.[7] ................................................ G01F 3/08
(52) U.S. Cl. ............................. 73/257; 73/253; 73/252
(58) Field of Search .......................... 73/252, 253, 254, 73/255, 257, 259

(56) References Cited

U.S. PATENT DOCUMENTS 4,388,835 A * 6/1983 Rosaen .................... 73/861.58
5,495,756 A * 3/1996 Robitaille et al. ............ 73/252
6,018,995 A * 2/2000 Lang ........................... 73/257

FOREIGN PATENT DOCUMENTS

WO 93/22631 * 11/1993

* cited by examiner

Primary Examiner—Hezron Williams
Assistant Examiner—Nashmiya Fayyaz
(74) Attorney, Agent, or Firm—Sidley Austin Brown & Wood, LLP

(57) ABSTRACT

A piston-type quantity meter including a metering chamber having a bottom, a cylindrical chamber shell, a cover, a central journal, a guide ring, two inlet opening formed, respectively, in the chamber bottom and the chamber cover, and a radial outlet opening formed in the chamber shell, an annular piston located in the chamber interior and having a cylindrical piston skirt, guide slot means formed in the piston skirt and corresponding to a width of separation wall located in the metering chamber for pinning the piston on the separation wall, and a radial outlet opening associated with the outlet opening formed in the chamber shell, and a seal strip for sealing at least one of a slit formed between the inner surface of the chamber shell and an outer surface of the annular piston, and a slit formed between the inner surface of the piston and the guide ring.

2 Claims, 5 Drawing Sheets

PISTON-TYPE QUANTITY METER

RELATED APPLICATION

This application is a continuation-in-part of application Ser. No. 09/113,709, filed Jul. 10, 1998, now abandoned.

BACKGROUND OF THE INVENTION

1. Field of the Invention

The present invention relates to a piston-type quantity meter including a metering chamber having a bottom, a cylindrical chamber shell, a cover, a central journal, a guide ring, a separation wall located in a chamber interior, two inlet opening formed, respectively, in the chamber bottom and the chamber cover, and a radial outlet opening formed in the chamber shell; and an annular piston located in the chamber interior and having a cylindrical piston skirt, a piston cap, piston journal means, guide slot means formed in the piston skirt and corresponding to a width of the separation wall for pinning the piston on the separation wall, and a radial outlet opening associated with the outlet formed in the chamber shell.

2. Description of the Prior Art

Piston-type quantity meters, which belong to volume meters, are well known and are disclosed, e.g., in U.S. Pat. No. 5,773,718 and International Publication WO93/22631. The known quantity meters, have a metering chamber through which an entire amount of fluid is forcefully flown. At that, a portion of a potential energy of a to-be-measured fluid is lost for driving the meter. The resulting pressure reduction is designated as a pressure loss as delta p. It results from deviations of the fluid flow path, cross-sectional changes along the flow path, from driving the annular piston of the meters, ets. . . .

In the metering chamber, an annular piston is arranged which during the measuring process, is displaced from a high pressure side to a lower pressure side. This displacement takes place automatically as a result of flow of the fluid through the meter. During rotation of the piston, two different volumes having, respectively, the same predetermined value are transported. During the transportation, the annular piston internal journal rotates about the central journal of the metering chamber.

The skirt of the annular piston is slotted over its entire height. The slot reciprocate once along a separation wall provided in the metering chamber with each revolution of the piston. The advantage of the oscillating movement of the piston consists in that the piston automatically returns into its initial position without any additional control elements, valves, slides, ets. . . .

The annular piston has, an upper journal for supporting a driver which transmits the rotary movement of the journal to a counter. A piston-type quantity meter of the above-described type is disclosed in a publication of Orlicek et al., "Zur Technik der Mengen—un Durchflussmessung von Flußssigkeiten" (Technik for measuring volume and flow rate of fluids), R. Oldenbourg Verlag, Munchen-Wien, 1971, p.p. 44–57.

In one type of piston quantity meters, an inlet opening is provide in both the bottom and the cover of the metering chamber, with a half of the volume of the to-be-measured fluid passing through each inlet opening. Rectangular slots, which are formed in the chamber shell and in the annular piston skirt, form outlet openings. With this flow of fluid through the metering chamber, in an ideal case, the axial flow forces acting on the piston are automatically balanced. See French Patent Publication FR-A 454609, article of Orlicek et al. "Zur Technik der Mengen-und Durchflusmessung von Fluessigkeiten," R. Oldenbourg Verlag, 1971, p.p. 44–57, and WO93/22631 (FIGS. 9 and 10).

Because in this type of piston-type quantity meters, the axial forces, which act on the piston, are automatically balanced, the meters of this type should have a greater measurement accuracy than the meters of the first two types. Actually, opposite is the case. The greater measurement inaccuracy of the piston-type quantity meters of this type is caused by formation of slits between the piston and the rectangular slot formed in the chamber shell and between the guide ring and the rectangular slot formed in the piston, respectively. Because of these slots the guide ring and the piston skirt, respectively, could not perform their sealing functions. Therefore, when the piston and the guide ring reach the respective slots, a noticeable increase of the effective slot width takes place, and this leads to a high slit leakage. For this reason, the piston-type quantity meter of this type could not be used up to the present.

Accordingly, an object of the present invention is to reduce the measurement error in the piston-type quantity meters with outlet slots formed in the chamber shell and the piston skirt.

SUMMARY OF THE INVENTION

This and other objects of the present invention, which will become apparent hereinafter, are achieved by providing a seal strip for sealing at least one of a slit formed between a chamber edge, which is defined by an intersection between a side wall of the outlet opening formed in the chamber shell and an inner wall of the chamber shell, and a piston edge, which is defined by an intersection between a side wall of the outlet opening formed in the piston skirt and an outer surface of the piston, and a second slot formed between a piston edge, which is defined by an intersection between a side wall of the outlet opening formed in the piston skirt and inner wall of the piston, and an outer wall of the guide ring.

According to the present invention, the seal strip can be secured, for sealing the outer slit, either to the chamber shell, projecting into the outlet opening formed in the piston skirt, or to the piston skirt, projecting into the outlet opening formed in the chamber shell.

The seal strip can be formed integrally with an element to which it is secured by being molded thereon.

BRIEF DESCRIPTION OF THE DRAWINGS

The features and objects of the present invention will become more apparent, and the invention itself will be best understood from the following detailed description of the preferred embodiments when read with references to the accompanying drawings, wherein.

DETAILED DESCRIPTION OF THE PREFERRED EMBODIMENTS

Figure 1A:
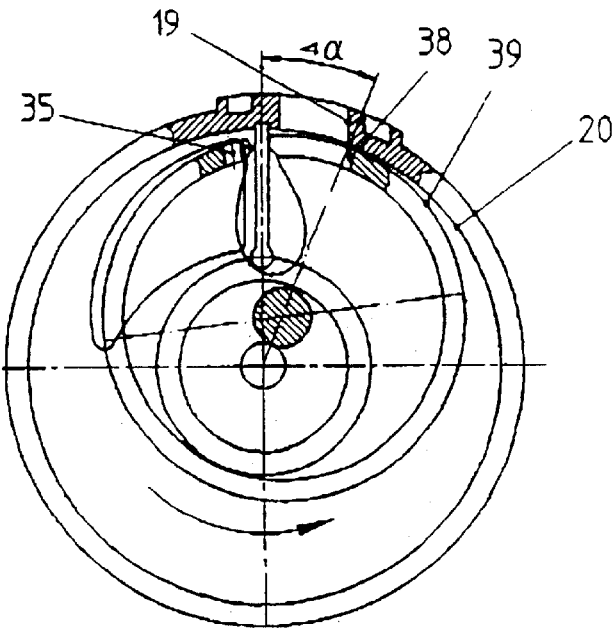
FIG. 1a shows a conventional piston-type quantity meter with an annular piston having radial outlet slots.
Figure 1B:
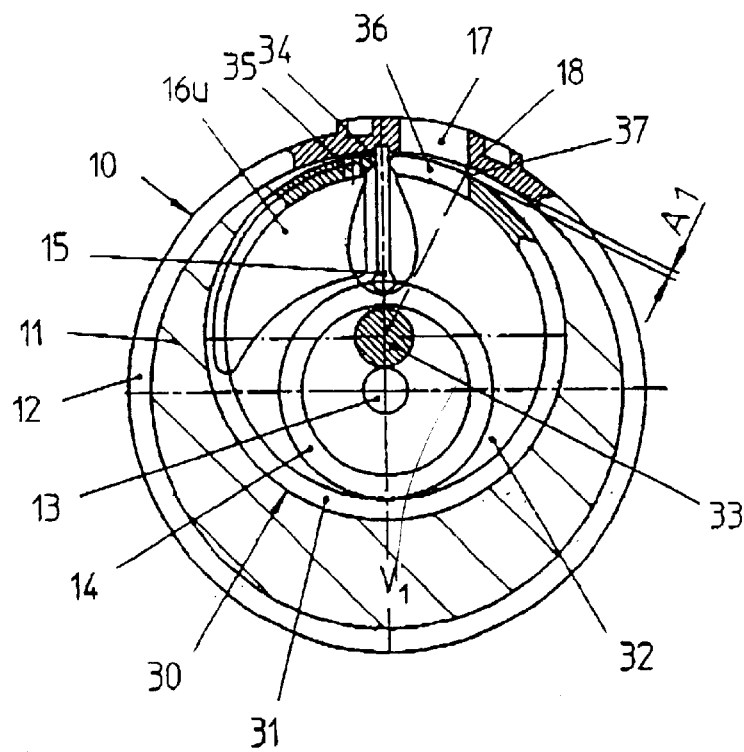
FIG. 1b shows the piston-type quantity meter shown in FIG. 1a with a displaced annual piston.

FIGS. 1 and 1b show a plan view of a piston-type quantity meter with elements necessary for explaining the present invention. The meter includes a metering chamber 10 with a bottom 11, a chamber shell 12, a central journal 13, a guide ring 14, and a separation wall 15. On the left, adjacent to the separation wall 15, there is provided a sickle-shaped inlet opening 16u for the measured water. An identical inlet opening 16o (see FIG. 7) is formed in a metering chamber cover 24 which is not shown in FIGS. 1a and 1b or the sake of clarity.

On the opposite side of the separation wall 15, a radial outlet opening 17 having a shape of a rectangular slot is provided in the chamber shell 12.

Inside the metering chamber 10, there is provided an annular piston 30 formed of a cylindrical piston skirt 31, piston cap 32, and a guide journal 33. The guide journal 33 rotates about the central journal 13.

A radial slot 34 is formed in the piston skirt 31 and the piston cap 32. With the radial slot 34, the annular piston 30 is pinned onto the separation wall 15. The linear movement imparted by the separation wall 15 and a circular movement, which imparted by the central journal 13 and the guide ring 14, in combination, provide for the known oscillating movement of the annular piston 30. A relief passage is formed in the piston skirt 31.

As shown in FIGS. 1a and 1b not only the metering chamber 12 but also the piston skirt 31 has an outlet opening designated with a reference numeral 36. This outlet opening 36 is necessary for discharging a partial metered volume inside the annular piston 30.

Figure 2A:
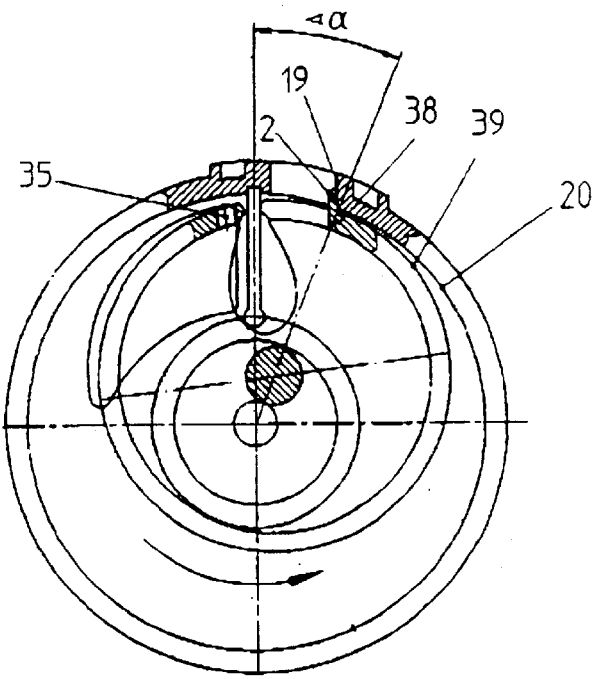
FIG. 2a shows the piston-type quantity meter shown in FIG. 1a with an outer seal according to the present invention.
Figure 2B:
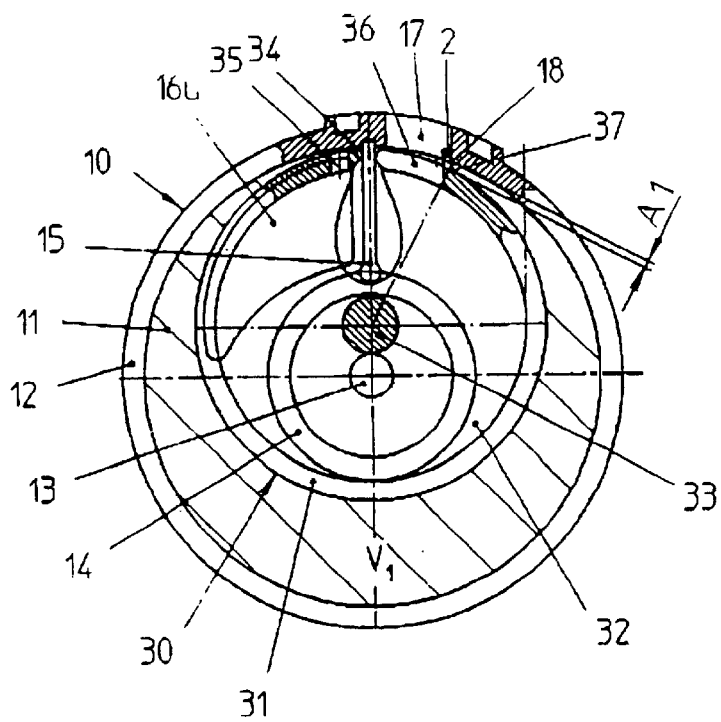
FIG. 2b shows the piston-type quantity meter shown in FIG. 2a with a displaced piston.

In the region of the outlet slot 17 and the outlet opening 36, respective portions of the chamber shell 12 and the piston skirt 31 are absent. As soon as the annular piston 30 reaches an angular position, which is defined by an angle $\alpha$, as shown in FIG. 1a, an additional slit is formed which attains its maximum size A1 in the position of the piston 30 shown in FIG. 1b. The slit is formed between a chamber edge 18, which is formed by an intersection between a side wall 19 of the outlet opening 17 and the inner wall 20 of the chamber shell 12, and a first piston edge 37, which is formed by an intersection between a side wall, 38 of the outlet opening 36 and a piston outer wall 39. A portion of the chamber volume V, which remains unmeasured, flows through the slit A1. FIGS. 2a and 2b show a first solution for eliminating the additional slit A1. A seal strip 2 is formed on the inner wall 20 of the chamber shell 12 in the region of the side wall 19. The seal strip 2 forms an extension of the side wall 19. It extends into the outlet opening 36 immediately adjacent to the side wall 38 of the outlet opening 36 which, as discussed above, is formed in the piston skirt 31. Thereby a labyrinth-type seal is formed which seals the slit A1.

Figure 3A:
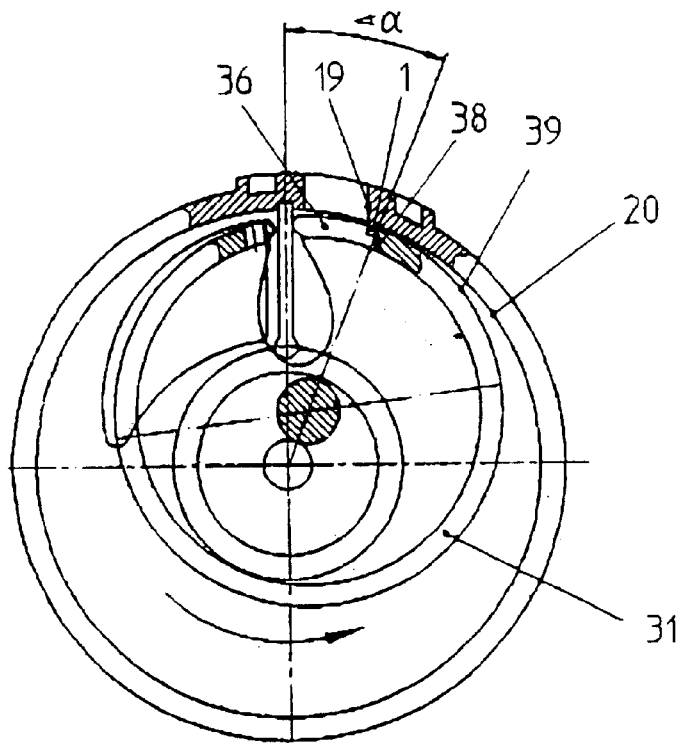
FIG. 3a shows the piston-type quantity meter shown in FIG. 1a with an alternative embodiment of the outer seal according to the present invention.
Figure 3B:
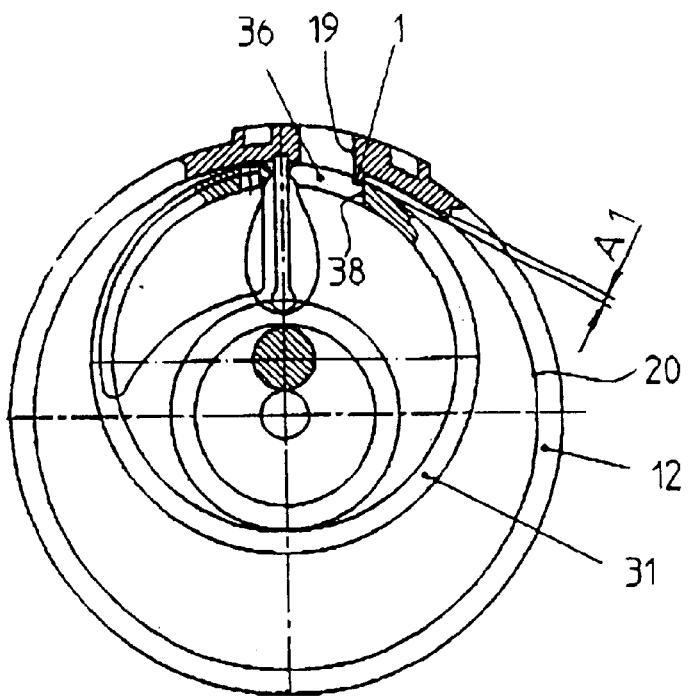
FIG. 3b shows the piston-type quantity meter shown in FIG. 3a with a displaced piston.

FIGS. 3a and 3b show another solution for sealing the additional slit A1. A seal strip 1 is formed on the side wall 38 of the outlet opening 36, forming an extension of the side wall 38, and projects into the outlet opening 17 formed in the chamber shell 12. This solution provides an additional advantage which consists in that the seal strip 2 deflects the stream of the outer measured volume in the direction toward the outlet opening 17 so that not only slit losses but also flow losses are reduced.

Figure 4:
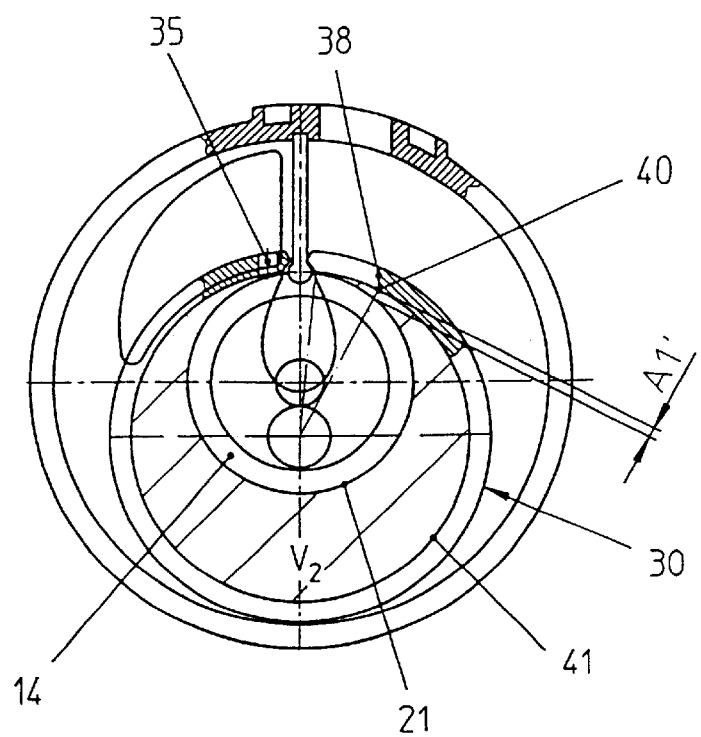
FIG. 4 shows the piston-type quantity meter shown in FIG. 2a with the annular piston being further displaced by 180°.
Figure 5:
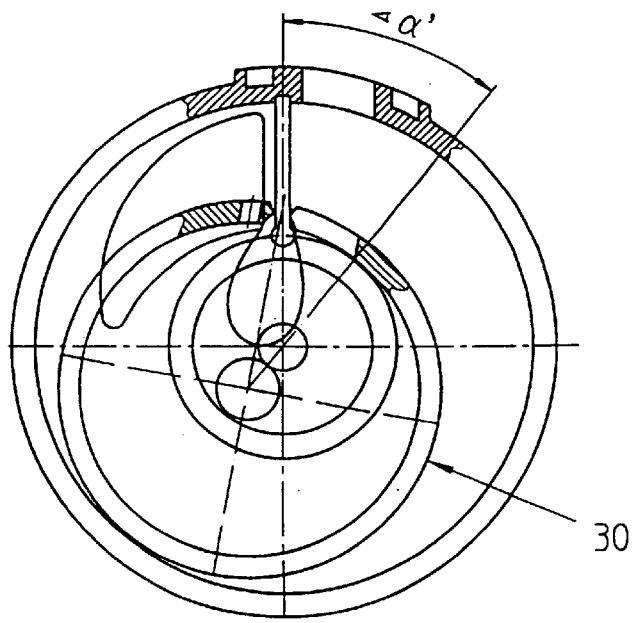
FIG. 5 shows the piston-type quantity meter shown in FIG. 4 with a displaced annular piston.

FIG. 4 show a piston-type quantity meter, which is shown in FIG. 2a, but with the piston having been displaced by 180°. As soon as the piston reaches an angular position $\alpha'$, as shown in FIG. 5, an additional slit is formed which attains its maximal size $A1^1$ in the angular position shown in FIG. 2. An unmeasured portion of the chamber volume V2 flows through the slit $A1^1$. The $A1^1$ is formed between a second piston edge 40, which is formed by an intersection of the side wall 38 and an inner wall 41 of the piston 30, and an outer wall 21 of the side guide ring 14.

Figure 6:
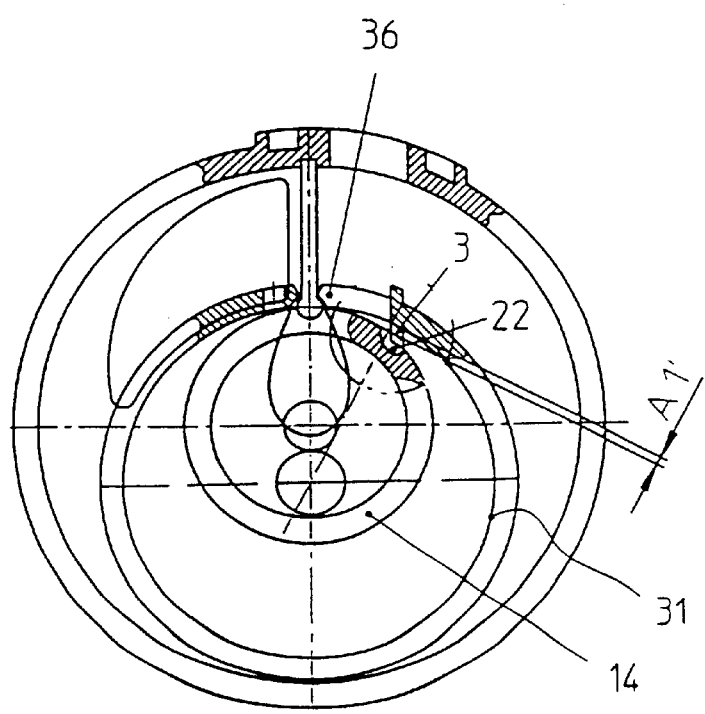
FIG. 6 shows the piston-type quantity meter shown in FIG. 4 with inner and outer seals according to the present invention.

FIG. 6 shows a solution with which the second additional slit A' can be sealed with a seal strip 3 which is formed on the inner side of the piston skirt 31. The seal strip 3 extends into a groove 22 formed in the guide ring 14.

The extension of the inner seal strip 3 forms the outer seal strip 2. With such a combined solution, both slits A1 and A1' can be sealed with the formed labyrinth seal, without in any way adversely affecting the functioning of the quantity counter. It should be obvious that sealing of the inner slit $A1^1$ with a seal strip, which is provided on the outer side of the guide ring 14 and which projects into the outlet opening 36 in the piston skirt 31, is also possible.

Figure 7:
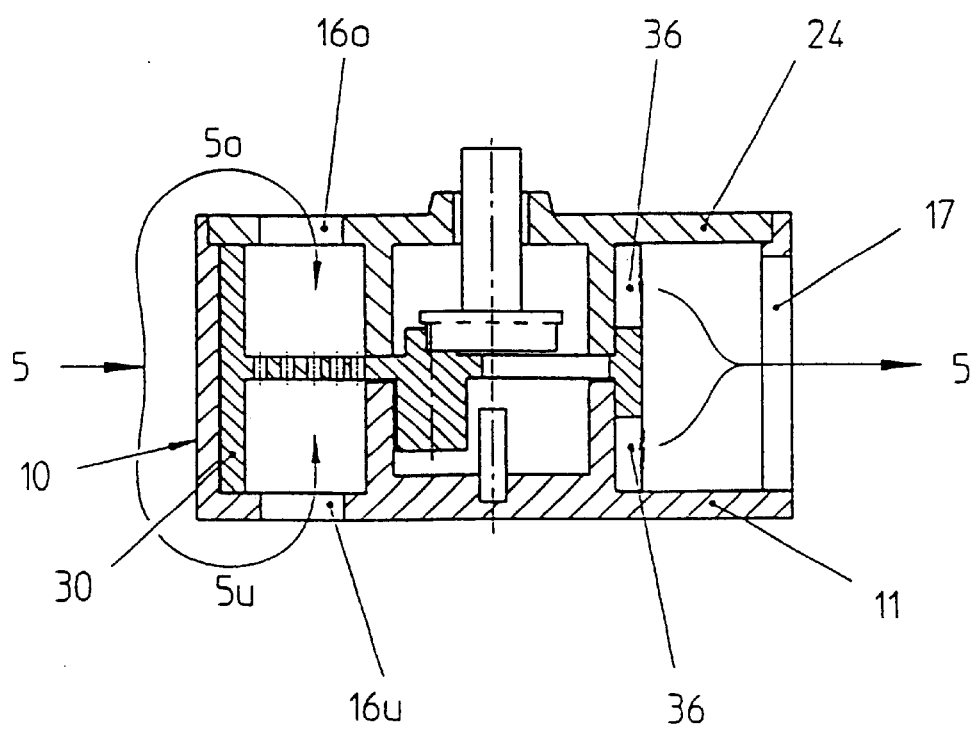
FIG. 7 shows a cross-sectional view of a standard piston-type quantity meter in which-the flow of fluid is shown.

FIG. 7 shows schematically a cross-sectional view of the metering chamber 10 and the annular piston 30 of a standard piston-type quantity meter. The lower inlet opening 16u in the bottom 11 and the upper inlet opening 16o in the cover 24 can be clearly seen. The fluid stream 5 separates in upper and lower partial streams 50 and 54. In the region of the outlet openings 17 and 36 both, both partial streams 50 and 54 are combined again and leave the metering chamber 10. Thereby, the forces acting on the annular piston 30 are automatically balanced, which positively influences the measurement precision and reduces wear.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A piston-type quantity meter, comprising:

a metering chamber having a bottom, a cylindrical chamber shell, a cover, a central journal, a guide ring and a separation wall located in a chamber interior, two inlet opening formed, respectively, in the chamber bottom and the chamber cover, and a radial outlet opening formed in the chamber shell;

an annular piston located in the chamber interior and having a cylindrical piston skirt, a piston cap, piston journal means, guide slot means formed in the piston skirt and corresponding to a width of the separation wall for pinning the piston on the separation wall, and a radial outlet opening formed in the piston skirt and associated with the radial outlet opening formed in the chamber shell; and a seal strip for sealing a slit formed between a chamber edge defined by an intersection between a side wall of the outlet opening formed in the chamber shell and an inner wall of the chamber shell, and a piston edge defined by an intersection between a side wall of the radial outlet opening formed in the piston skirt and an outer surface of the piston, the seal strip being secured on the chamber shell and projecting into the outlet opening formed in the piston skirt immediately adjacent to the side wall thereof.

2. A piston-type quantity meter, comprising:

a metering chamber having a bottom, a cylindrical chamber shell, a cover, a central journal, a guide ring and a separation wall located in a chamber interior, two inlet opening formed, respectively, in the chamber bottom and the chamber cover, and a radial outlet opening formed in the chamber shell;

an annular piston located in the chamber interior and having a cylindrical piston skirt, a piston cap, piston journal means, guide slot means formed in the piston skirt and corresponding to a width of the separation wall for pinning the piston on the separation wall, and a radial outlet opening formed in the piston skirt and associated with the radial outlet opening formed in the chamber shell; and seal strip for sealing a slit formed between a chamber edge defined by an intersection between a side wall of the outlet opening formed in the chamber shell and an inner wall of the chamber shell, and a piston edge defined by an intersection between a side wall of the radial outlet opening formed in the piston, the seal strip being secured on the piston skirt and projecting into the outlet opening forward in the chamber shell immediately adjacent to the side wall thereof.

* * * * *